Aug. 22, 1961 A. O. PITNER 2,997,349
THRUST BEARING UNITS HAVING MOVING BEARING ELEMENTS
Filed July 30, 1957 2 Sheets-Sheet 1
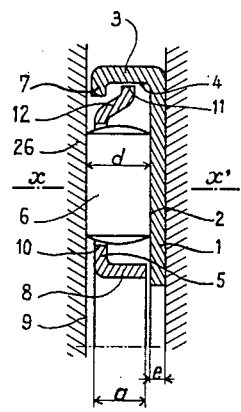
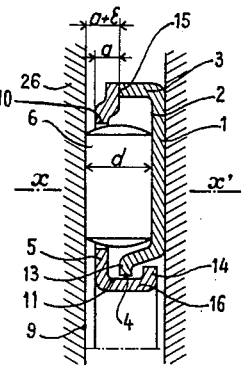
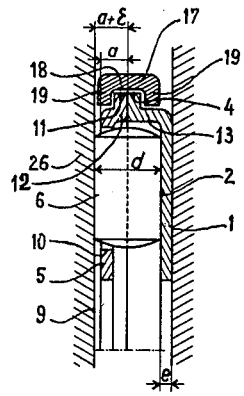
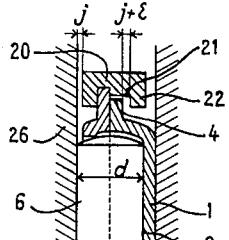
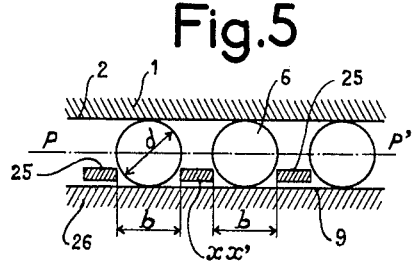
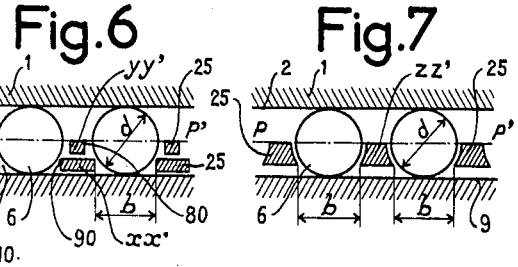
Inventor
Alfred Otto Pitner
By Albert L. Ely, Attorney Aug. 22, 1961  A. O. PITNER  2,997,349
THRUST BEARING UNITS HAVING MOVING BEARING ELEMENTS
Filed July 30, 1957  2 Sheets-Sheet 2
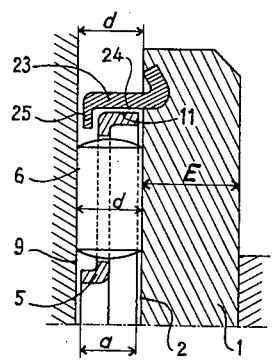
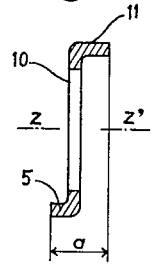
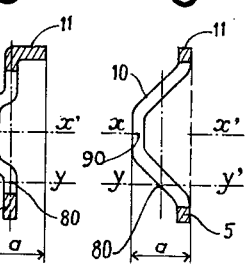
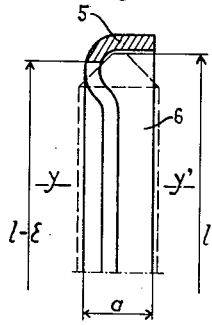
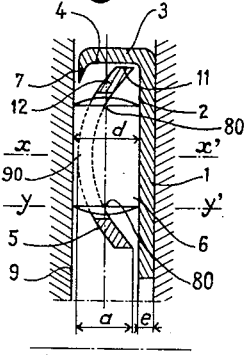
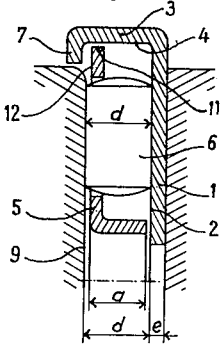
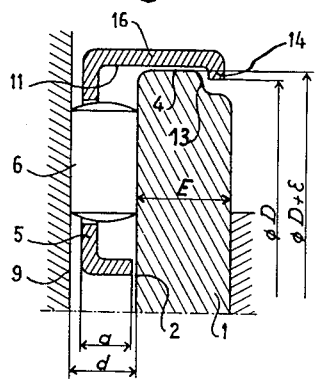
Inventor
Alfred Otto Pitner
By Albert D. Fries, Attorney

United States Patent Office 2,997,349
Patented Aug. 22, 1961

2,997,349
THRUST BEARING UNITS HAVING MOVING BEARING ELEMENTS
Alfred Otto Pitner, Paris, France, assignor, by direct and mesne assignments, of one-half to Societe Anonyme des Roulements a Aiguilles, Rueil-Malmaison, France, a French company
Filed July 30, 1957, Ser. No. 675,056
Claims priority, application France Mar. 1, 1957
3 Claims. (Cl. 308—235)

It is known to use various forms of thrust bearings with moving bearing elements having a member for locating these moving elements which are inserted in sockets provided in the said locating member; this unit is placed between two bearing races which may be of any desired shape, but preferably plane or having slightly curved generatrices, according to a known arrangement.

Units of this kind which have hitherto been constructed, have various disadvantages which do not permit of simple use thereof in all circumstances and, especially when they have to be located in particularly inaccessible places or for assembling in a large series; it would therefore be particularly advantageous to have available a unit occupying only little axial space, easy to handle and install, formed by a plate or member carrying or forming one of the bearing races, the member for locating the moving elements and these elements themselves.

The specific object of the present invention is the construction of a unit constituted in this manner.

In accordance with the present invention, this unit has essentially the following elements:
A bearing race plate,
An elements locating washer for receiving and locating the moving elements,
The moving elements of the bearing,
Means assuring, in the event of the unit being handled when detached, assembly of the elements locating washer and of the bearing race plate as well in a radial direction as in an axial direction.

With such a unit correct positioning of all the elements of the thrust bearing relative to one another is assured and the scattering of its components is avoided.

Numerous thrust bearing units may be constructed in accordance with the above-defined principle; among these the invention concerns more particularly those having at least one of the following features:

(1) The elements locating washer is provided with means preventing the moving elements being scattered both in the direction towards the bearing race plate and in the opposite direction, or (2) The elements locating washer is provided with means retaining the moving elements only in the direction away from the bearing race plate.

(3) The contacts between the surfaces situated near the ends of the moving elements and the elements locating washer are arranged in the region of the common diametrical plane of the bearing elements or symmetrically relative to this plane in such manner as to avoid any axial component of the forces present which could press said locating washer forcibly against one of the bearing races.

(4) The means of assembling the bearing race plate and the elements locating washer form an integral part:
(a) Of the bearing race plate, or
(b) Of the elements locating washer.

(5) The construction of a unit in accordance with that defined under 4 by way of a particular shape given to at least one of the members of the assembly.

(6) The construction of the above-mentioned means of assembly by way of a separate member.

(7) In the case of a unit conforming with that defined under 6, the separate member is:
(a) Rigid with the elements locating washer, or
(b) Rigid with the bearing race plate, or
(c) It freely encloses these two members.

(8) Means for correctly centering the bearing race plate relative to the elements locating washer during operation, these means having a shape and surface quality permitting, without premature wear, the friction due to speeds and stresses occuring during operation.

(9) The assembling of the elements locating washer and the bearing race plate:
(a) By the inner edges of these members,
(b) By their outer edges.

(10) The effecting of this assembly by means of edges of the assembled members, said edges being provided:
(a) Over all the periphery thereof, or
(b) Only at specified points thereon.

(11) The construction of the bearing race with a circular disc of less thickness than the diameter of the moving elements.

(12) The construction of the bearing race plate with a peripheral edge retaining the elements locating washer.

(13) The construction of the elements locating washer with a cylindrical peripheral flange retaining the bearing race plate, this flange being provided:
(a) Over the whole periphery thereof, or
(b) Over a portion of this periphery.

(14) Construction of the elements locating washer with a radial section making it possible to assure:
Contact with the surfaces situated near the ends of the moving elements, in the vicinity of the common diametrical plane of these moving bearing elements and the retaining of the moving bearing elements by points located outside this diametrical plane and the space between which is less than the diameter of said elements.

The construction of the elements locating washer with a general thickness at the most equal to the radius of the moving elements in their maximum section and having the characteristics defined in the preceding paragraph.

(15) The construction of the above-described thrust bearing unit with a thickness such that none of the parts constituting the thrust bearing exceeds a plane defined by the bearing race opposite that borne by the bearing race plate incorporated in the unit.

Still further objects, features and advantages of the invention will appear from the following description, with reference to the attached diagrammatical drawings, of several thrust bearing units according to the invention given by way of example and which cannot in any manner limit the scope of the present invention.

In the drawings:

FIG. 1 is a radial section taken through a needles thrust bearing unit in which the bearing race plate and the needles locating washer are assembled by their outer edges.

FIG. 2, a radial section of a second needles thrust bearing unit in which the bearing race plate and the needles locating washer are assembled by their inner edges.

FIG. 3, a radial section of a third needles thrust bearing unit in which the bearing race plate and the needles locating washer are joined together by means of a separate independent member.

FIG. 4 is also a radial section of a variation of the arrangement in FIG. 3 in accordance with which this separate member is rigidly connected with the elements locating washer.

FIG. 5, a cross-section of a needles thrust bearing unit according to any of the preceding examples, this section being taken, for instance, on one of the lines $x$—$x'$ of FIGS. 1 and 2 and showing a method of arranging bars retaining the needles on the opposite side of the bearing race plate.

FIG. 6, a cross-section taken through another example of constructing a needles thrust bearing unit showing bars retaining the needles in the case of a needles locating washer constructed according to any one of those shown in a radial section in FIGS. 10, 11 and 13, this FIG. 6 showing in reality, two cross-sections of the said locating washer, one on the median plane x—x' and the other on a plane y—y' situated near one of the ends of the needles.

FIG. 7 is a cross-section of a needles thrust bearing comprising a needles locating washer according to FIG. 9, the section being taken on the line z—z' of FIG. 9.

FIG. 8, a radial section of a needles thrust bearing unit having a thick bearing race plate provided with an attached ring for locating the needles locating washer.

FIG. 9, a radial section of the needles locating washer detached from FIG. 8.

FIGS. 10–11, radial sections of two variations of the same washer.

FIG. 12, also a radial section of another needles locating member retaining the needles on the side opposed to the bearing race plate.

FIG. 13, a radial section of a needles thrust bearing unit in which the needles locating washer has an arcuate radial section.

FIG. 14, a radial section of a needles thrust bearing unit in which the shape of the members has been simplified, and the bearing race plate cooperating with the unit is of limited diameter.

FIG. 15, a radial section of another needles thrust bearing unit in which the needles locating washer is attached to the outside of the bearing race plate of the unit.

In these various figures, the same reference signs indicate the same or equivalent parts.

The unit shown in FIG. 1 comprises a bearing race plate 1 serving as an abutment and constructed for this purpose with a plane circulating face 2; on its periphery it is provided with an axial extension 3, the inner cylindrical face 4 of which serves for radially retaining a washer 5 carrying a plurality of bearing elements 6.

The cylindrical part 3 of the abutment plate terminates in the radial flange 7, the inner diameter of which is less than the outer diameter of the washer 5 in order to assure that the latter is kept in an axial direction.

The washer 5 has sockets 10 for receiving and retaining the bearing elements; these sockets will be described hereinafter with reference to FIG. 5 and, if desired, as a variation in FIGS. 6 and 7.

These sockets do not allow the bearing elements to pass through the washer 5 and retain them with their diametrical planes inside the space defined by the bearing race plate 1 and the washer 5.

The washer 5 has a cylindrical edge 11 cooperating with the cylindrical face 4 of plate 1 in order to ensure its radial position and, if desired, centering thereof relative to this plate 1.

The washer 5 is also provided with an inner axial flange 8, the axial length $a$ of which is slightly less than the diameter $d$ of the bearing elements, that is to say, than the space between the circulating tracks or bearing races of these elements: 2 forming a part of the above plate 1, and 9 forming a part of the member 26 of the machine which is associated with the thrust bearing unit.

This general form of the washer 5 is such that, in its axial displacements, permitted by the difference in the dimensions existing between its axial dimensions $a$ and the space $d$ separating the bearing races—said space being equal to the diameter of the moving elements 6—its peripheral portion cannot come into contact with the retaining flange 7 of member 1.

In order to facilitate the construction of the bearing race plate 1 in the form illustrated, that is to say, with the cylindrical wall 3 and an inner flange 7, this plate 1 is of reduced thickness less than the diameter $d$ of the moving elements 5.

This wall 3 and the flange 7 may be obtained by simple stamping and embossing operations on the plate 1.

The flange 7 may be a continuous flange or a discontinuous flange formed by local projections, preferably distributed uniformly over the circular periphery of this wall 3; for example, three projections suffice.

FIG. 2 shows a variation for constructing the unit shown in FIG. 1.

Whereas, in FIG. 1, the connecting of the bearing plate 1, carrying the first race 2, to the washer 5 carrying the moving elements is effected by the outer peripheries of this plate and of this washer, in FIG. 2 the connecting of the same members is effected by their inner peripheries.

As above, the plate 1 has the plane face 2 for the circulation of the bearing elements 6 and, in addition, at the end of its outer peripheral extension 3 there exists a plane face 15 against which the washer 5 may be applied.

The plate 1 is terminated, in its inner portion, by the cylindrical edge 4 located at the end of an extension 13 of the said plate; this cylindrical face 4 co-operates with the cylindrical face 11 of an axial extension 16 provided on the centre portion of the washer 5 for radially retaining and, if desired, centering this washer 5 relative to the plate 1.

The flange 13 of plate 1 cooperates with a flange 14 terminating the axial extension 16 of the washer 5 to ensure the axial retention of the latter relative to the bearing plate 1.

The flange 14 may be, like flange 7 of FIG. 1, continuous or discontinuous.

The thickness $a$, of the washer 5 in front of the face 15 is slightly less than the distance $a+\epsilon$ separating this face 15 from the face 9 for the circulation of the moving elements on the member 26 associated with the thrust bearing.

FIG. 3 shows a thrust bearing similar to the two preceding bearings, but in which the extension 13 of the thrust bearing plate 1 similar to that of FIG. 2, and 12 of the washer similar to that of FIG. 1, are associated with an independent member 17 which covers the members 1 and 5; at the same time this member 17 assures:

The radial retention of these members 1 and 5 and, if desired, centering thereof by its inner cylindrical face 18 in co-operation with the faces 4 of the plate 1 and 11 of the washer 5.

The axial retention of the same members by two flanges 19 which have the same objects as the flanges 7 and 14 of the preceding FIGURES 1 and 2.

FIG. 4 shows a thrust bearing of the type illustrated in FIG. 3; but in this thrust bearing, the additional member 20, distinct from the members 1 and 5 ensuring retention and, if desired, centering, is not independent; it is made rigid with the washer 5 for example, by moulding.

Its cylindrical face 21 assures the radial retention and, if desired, centering of the plate 1 in co-operation with the cylindrical face 4 thereof.

In FIG. 5 which is a cross-section of a thrust bearing unit constructed in accordance with any one of the preceding units and, in particular, with one of those in FIGS. 1 and 2, the section being taken along the line x—x' of these figures, the bearing elements 6 of diameter $d$ are retained in their receiving sockets, and on the side opposed to the bearing plate 1, by bars 25 which, at least over one portion of their length, are separated from each other by spaced intervals $b$, $b$ smaller than the diameter $d$ of the needles.

FIG. 6 shows in juxtaposition two sections taken through a needle's thrust bearing provided with a cage washer, the radial section of which is of those illustrated in FIGS. 10, 11 and 13; one is taken on the plane x—x' passing through the laterally protruding slotted outer portions 90 of the cage washer, i.e., near the middle of the needles, the bars 25 being separated from one another by a spaced interval $b$ smaller than the diameter $d$ of the needles, the other through the intermediate slotted portions 80 (FIGS. 10, 11 and 13) situated in the common median plane containing the axes of all the needles, and showing the section $y$—$y'$ of these bars, the distance $b$ of the bars from one another being at this point 80 greater than the diameter $d$ of the needles. The inner solid portions 11 or 12 of the cage washer (FIGS. 10 to 13) are straddled by the connecting means 3 (FIG. 13).

In FIG. 7, which is a cross-section of the washer which is shown in FIG. 8 and represented detached in FIG. 9, said section being taken on the line $z$—$z'$ of FIG. 9, the bars 25 are adjacent to the median plane $p$—$p'$ common to the needles 6 and have a cross section such that their faces remote from this median plane $p$—$p'$ have their opposing edges separated from one another by an amount $b$ less than the diameter $d$ of the needles; this arrangement thus assures that the needles of the thrust bearing unit are kept against the bearing plate 1 whenever this thrust bearing unit is handled when detached, thus avoiding any escape of the needles from the washer.

By the observation of the condition $$b < d$$

in each of the thrust bearing units shown in FIGS. 5, 6, 7, any scattering of the needles out of the washer connected to the plate is avoided.

FIG. 8 shows a thrust bearing comprising a bearing race plate 1 having a substantial thickness E greater for example than the diameter of the bearing elements 6.

By virtue of this thickness, this plate can no longer be treated by stamping or embossing; therefore the axial extension 23 which it has, consists of a separate member laid on it; this extension 23 ensures by its inner cylindrical face 24 and its flange 23, the radial and axial retention, and, if desired, centering of the washer 5.

FIG. 9 shows the washer 5 detached from FIG. 8.

FIGS. 10 and 11 are two variations of this washer due to which, as shown in FIG. 6, the moving elements are retained by the centre portions 90—90 of the bars separating the sockets (section $x$—$x'$ of FIG. 6) located on the side opposed to the bearing plate 2, whereas, in their end portions they are guided by the end portions 80—80 of the bars separating the sockets (section $y$—$y'$ of FIG. 6) in the vicinity of the common median plane of the needles.

FIG. 12 shows a variation of the washer 5 in FIGS. 1, 8, 13, 14, in which variation the bearing elements are not retained by the means shown in FIGS. 5, 6, and 7 in which the sockets are not so large as the diameter of these elements; here it is the axial passage which has the value $l - \epsilon$ for a length $l$ of the bearing elements 6.

FIG. 13 is a variation of FIG. 1 with a washer 5 of arcuate shape, differing from that in FIG. 1.

As in FIG. 1, the outer cylindrical edge 11 of this washer 5 co-operates with the face 4 of the plate 1 to retain in a radial direction the washer 5 inside the plate 1.

The continuous or discontinuous edge 7 axially retains the washer 5 when the thrust bearing unit is handled when detached.

Finally, as in FIG. 1, the total thickness $a$ of the washer is slightly less than the diameter $d$ of the bearing elements, that is to say, than the space between the bearing races.

This arcuate shape of the washer makes it possible to assure in a simple manner:

(a) Contact of the ends of the bearing surfaces of the moving elements with the corresponding part 80 of the sockets, substantially in the vicinity of the diametrical plane common to these bearing elements, by thus forming an excellent guide of these moving elements and avoiding that, upon contact of the moving elements with the walls of the sockets, a component is produced in an axial direction capable of pressing the washer 5 heavily against one of the bearing races 2 or 9 (section $y$—$y'$ of FIG. 6);

(b) The retention of the bearing elements 6 on the outside, by the arrangement, on the line $x$—$x'$ of FIG. 13, of the part 90 most remote from the bearing race 2 of the plate 1.

FIG. 14 is a variation of FIG. 1 in which the forms of the members are simplified; this form can, however, only be utilised in cases where it is possible to permit the face 9 to have an outer diameter less than the inner diameter of the flange 7; in this figure, the arrangement of the sockets and the bearing elements shown in FIG. 13 could be adopted.

FIG. 15 shows a variation of FIG. 2 in which the plate 1 is of a substantial thickness which is not less than the diameter of the bearing elements 6.

As in FIG. 2, the washer 5 has a cylindrical axial extension 16; this extension assures:

By a cylindrical face 11 co-operating with a face 4 of the member 1 a radial retention and, if preferred, centering of one relative to the other of the two members 1 and 5.

By the flange 14 in co-operation with the plane face 13, the axial retention of these two members 1 and 5 relative to each other.

In practice thrust bearings having moving elements in accordance with those defined above will be constructed with moving elements formed by rollers or needles, the length of which will be at least twice the diameter thereof.

Finally, the present invention also includes machines, apparatus and installations having at least one thrust bearing unit with moving bearing elements according to any one of those defined above.

What I claim is:

1. In combination with a shaft having a plane annular race surface and a supporting structure having a transverse wall, a needle thrust bearing assembly comprising in combination a number of radially arranged substantially cylindrical needle rollers directly engaging the race surface of said shaft, a guiding and retaining apertured annular cage washer, each needle roller extending through a slot of said cage washer, a race washer having an inner plane hard rolling surface engaging said rolling elements and an outer plane surface bearing on the transverse wall of said supporting structure, interconnecting means for said washers and needle rollers, including a cylindrical flange of U-shaped cross-section straddling over one edge of one of said washers and having an operative connection with the other of said washers to restrict axial relative separating movement of said washers, the slots of said cage washers having outer portions narrower than the maximum diameter of said needle rollers, whereby said needle rollers and said washers are retained in assembled relation, said interconnecting means and washers having such radial dimensions that said cage washer can rotate with play relatively to said race washer, all component parts of said bearing assembly being located between the plane surface of said race washer engaging said transverse wall and the annular race surface of said shaft, whereby an unobstructed radial path is provided for the circulation of lubricant along said annular race surface and needle rollers.

2. A needle thrust bearing assembly comprising a single annular race washer having a plane bearing face, an annular cage washer having a plurality of radially extending peripherally spaced slots, a plurality of substantially cylindrical needle rollers, each one extending through one of said slots with a portion of each roller projecting beyond the face of said cage washer which faces away from said race washer, said slots having portions narrower than the diameter of said rollers located beyond the plane containing the roller axes relatively to said race washer to retain said rollers between said cage washer and said race washer, and means interconnecting said cage washer and said race washer at their peripheries to retain said rollers and two washers in assembled relation, said interconnecting means comprising a cylindrical flange of U-shaped cross-section straddling over one edge of one of said washers, with a radial clearance therebetween, and having an operative connection with the other of said washers to restrain axial displacements of said washers away from each other, all component parts of said bearing assembly being located on the same side of the outer plane surface of said race washer and on the same side of a plane tangent to the exposed surfaces of said needle rollers, at least within a circle encompassing said needle rollers.

3. A needle thrust bearing assembly as claimed in claim 2, wherein said cage washer consists of a single member having laterally protruding slotted outer portions where the width of said slots is less than the diameter of said needle rollers, intermediate slotted portions where said width is slightly larger than said diameter, and inner solid portions straddled by said interconnecting means, said intermediate slotted portions lying close to the plane containing the axes of said needle rollers.

References Cited in the file of this patent

UNITED STATES PATENTS

| | | |
|---|---|---|
| 73,815 | Laplace | Jan. 28, 1868 |
| 1,296,650 | Graham | Mar. 11, 1919 |
| 2,174,325 | Large | Sept. 26, 1939 |
| 2,327,880 | Fernstrom | Aug. 24, 1943 |
| 2,854,300 | Winchell | Sept. 30, 1958 |
| 2,891,828 | Winchell | June 23, 1959 |

FOREIGN PATENTS

| | | |
|---|---|---|
| 28,609 | Sweden | Apr. 2, 1910 |
| 89,090 | Sweden | Apr. 20, 1937 |